Oct. 27, 1970     O. M. CRECELIUS     3,535,812
ILLUMINATED FISHING LURE
Filed Nov. 5, 1968
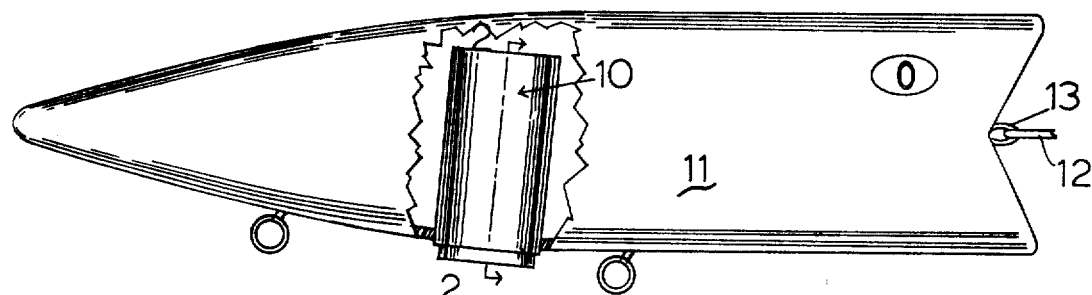
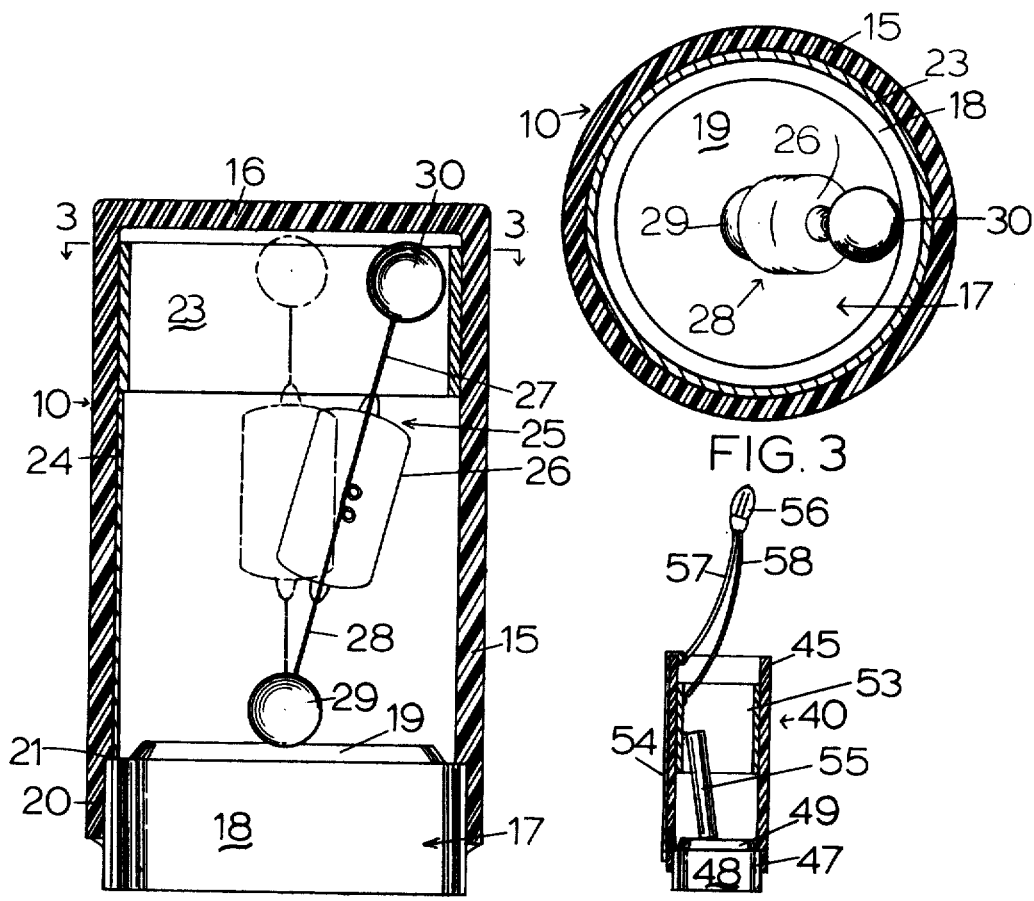
INVENTOR.
OVID M. CRECELIUS
BY
*Harrington A. Lackey*
ATTORNEY

United States Patent Office 3,535,812
Patented Oct. 27, 1970

3,535,812
ILLUMINATED FISHING LURE
Ovid M. Crecelius, 1235 Joseph Ave.,
Nashville, Tenn. 37207
Filed Nov. 5, 1968, Ser. No. 773,484
Int. Cl. A01k 75/02, 97/12
U.S. Cl. 43—17.6
3 Claims

ABSTRACT OF THE DISCLOSURE

An illuminated fishing lure including an elongated hollow translucent body having a top and bottom and a side wall. The body has a miniature battery at the bottom thereof and has an annular, endless conductor ring in the top on the side wall and entirely within the body. The ring is electrically connected to one pole of the battery. An elongated conductor member having a light source with colinear rigid upper and lower conductor wires is disposed substantially upright and entirely within the body. At the end of each wire is disposed an electrical contact element, one contact element normally resting on the other pole of the battery. The conductor member moves freely to make and break contact with the conductor ring, and the light source is adapted to illuminate when the other contact element of the conductor member makes contact with the ring.

Background of the invention

This invention realtes to a fishing lure, and more particularly to an intermittently illuminated fishing lure.

Iluuminated fishing lures, including intermittently illuminated fishing lures, are known in the art. However, the various electrical components and circuits incorporated in such prior illuminated fishing lures render the lures unduly complicated, bulky and expensive.

Summary of the inevntion

It is therefore an object of this invention to provide an intermittently illuminated fishing lure in which the illuminating components occupy but a small portion of the lure housing, are light in weight, and simply and economically constructed.

Another object of this invention is to provide an illuminated fishing lure in which the illuminating components are compactly contained in a replaceable modular unit, adapted to be easily inserted and removed from the lure housing.

The illuminated fishing lure made in accordance with this invention includes an elongated transparent hollow body into the bottom of which is mounted a miniature battery. A conductor band or ring is mounted within the upper portion of the body and connected to one pole of the battery by an electrical lead. The conductor member is loosely contained upright within the body so that its lower end is in constant contact with the other pole of the battery, while the upper end is free to move radially to intermittently engage various portions of the conductor band, depending upon the movement of the body. The light source is connected in the circuit established by the battery, conductor ring, lead and conductor member so that it will illuminate when the conductor member makes contact with the conductor band.

Brief description of the drawing

FIG. 1 is a side elevation of a fishing lure housing, with parts broken away to disclose the iluuminating unit;

FIG. 2 is an enlarged section taken along the line 2—2 of FIG. 1 of the illuminating unit, with the battery and conductor member disclosed in full side elevation, and with the conductor member disclosed in make and break positions;

FIG. 3 is a section taken along the line 3—3 of FIG. 2; and

FIG. 4 is a reduced sectional elevation, similar to FIG. 2, of a modified illuminating unit.

Description of the preferred embodiments

Referring now to the drawings in more detail, FIG. 1 discloses an illuminating unit 10 made in accordance with this invention, mounted within a typical translucent, or transparent, fishing lure housing 11, adapted to be connected to a fishing line 12 by means of the eyelets 13.

As best disclosed in FIGS. 2 and 3, the illuminating unit 10 includes an elongated, cylindrical, hollow, translucent body 15, having a closed top end 16 and an open bottom. Closing the bottom end of the body 15 is a miniature battery 17, of any conventional type having a cylindrical base surface, constituting the negative pole 18 of the battery, and an upwardly projecting positive pole surface 19. The negative base portion 18 is adapted to snugly fit within a cooperating circular recess 20, having an upper ledge portion 21, in the bottom of the body 15. The upper ledge 21 limits the upward movement of the battery 17 within the body 15 during assembly of the unit 10.

Mounted upon the inner surface of the upper wall portion of the body 15, and coaxially with the body 15, is an annular conductive band or ring 23. The conductor band 23 is preferably connected to the neagtive portion 18 of the battery 17, by means of a conductive lead 24, disclosed in the form of a metal strip in FIG. 2, secured vertically along one portion of the side wall of the body 15.

An elongated conductor member 25, includes a miniature light bulb 26, a substantially rigid upper conductor wire 27, and a substantially rigid lower conductor wire 28. The lower end of the conductor wire 28 terminates in a lower electrical contact 29 adapted to rest upon and in electrical contact with the positive pole 19 of the battery 17. The upper end of the upper wire 27 terminates in another electrical contact 30 which is free to move substantially radially (more accurately in a spherical surface bounded by the circular band 23, and whose radius is equal to the length of the conductor member 25), to make-and-break contact with the circular band 23. FIG. 2 discloses the conductor member 25 in its normal, leaning solid-line position making contact with the conductive band 23, and in a vertical phantom position breaking contact with the circular band 23. Thus, when the body 15 is at rest, the conductor member 25 is normally in a leaning position with its upper contact 30 resting against the conductive band 23. However, when the body 15 is moved radially with a sufficient minimum threshold acceleration such as by an abrupt pulling of the fishing line 12 on the lure housing 11, the conductor member 25 will break contact with the ring 23, and be jostled to another leaning position. Thus the abrupt movement of the lure housing 11 will create indiscriminate and intermittent flashes of illumination from the light bulb 26 as the upper contact 30 makes and breaks contact with the conductive band 23 to close and open the electrical circuit through the conductor member 25, band 23, lead 24 and battery 17.

In the modified illuminating unit 40 disclosed in FIG. 4, the elongated body 45 is also hollow, translucent and preferably cylindrical. The body 45 has an open top as well as an open bottom. The open bottom is completely closed by the miniature battery 47 having the negative base portion 48 and a positive pole 49. The battery 47 is identical to the battery 17. An endless conductive band, or ring, 53, similar to the conductive band 23, is mounted on the inside of the upper portion of the body 45.

However, the conductive ring 53 is connected to the negative portion 48 of the battery 47, not only through a conductive lead strip 54 extending up the outside body 45, but also through a miniature light bulb 56, connected to the lead 54, by conductor wire 57, and to the conductive ring 53 through conductor wire 58.

In order to establish the intermitten electrical contact between the conductive ring 53 and the positive pole 49 of the battery 47, an elongated conductor member 55 is supported in a substantially upright position, with its lower end engaging the positive pole 49 and its upper end adapted to contact any portion of the ring 53 when the conductor member 55 is in a leaning position. It will be noted that the conductor member 55, in the modification of FIG. 4, is merely an elongated rigid metal conductor bar, long enough to establish electrical contact between the battery 47 and the ring 53 in any position to which the conductor bar 55 might be moved by the abrupt movements of the body 45.

The main difference between the units 10 and 40 of FIGS. 2 and 4, respectively, is the location of the miniature light bulbs 26 and 56 in the circuits established by the respective illuminating components.

The illuminating unit 10 has certain advantages over the unit 40 in the consolidation of components and compactness. By incorporating the light source 26 within the conductor member 25, the protruding conducting wires 57 and 58 in the unit 40 are eliminated. Furthermore, all of the basic electrical components, that is the battery 17, the conductor member 25, the conductor ring 23 and lead 24, may be completely enclosed within the body 15 of FIG. 2 by the top wall 16. Thus, all the components of the illuminating unit 10 are encapsulated to provide an easily handled module which may be quickly inserted and removed from the lure housing 11 for inspection or substitution.

What is claimed is:
1. An illuminated fishing lure comprising:
   (a) an elongated, hollow body having a top and bottom and a translucent side wall,
   (b) an electrical battery in the bottom of said body, said battery having an upper pole within said body, and an opposite pole,
   (c) an electrically conductive endless annular band mounted entirely inside said body on said side wall proximate said top and spaced above said upper pole,
   (d) a lead electrically connecting said band to said opposite pole,
   (e) an elongated, substantially rigid, conductor member freely movable entirely within said body and spanning the distance between said upper pole and the interior surfaces of said band, said conductor member comprising:
      (1) a light bulb having substantially colinear and rigid upper and lower conductor wires,
      (2) a lower electrical contact on the lower end of said lower conductor wire resting in electrical contact on said upper pole,
      (3) an upper electrical contact on the upper end of said upper conductor wire normally in electrical engagement with some portion of said band when said conductor member is at rest, said upper contact being free to move away from electrical engagement with said band.

2. The invention according to claim 1 in which said band is circular, the center of said circular band being coaxial with the vertical axis of said body.

3. The invention according to claim 1 further comprising a translucent lure housing adapted to be secured to a fishing line, said body being mounted within said lure housing.

References Cited

UNITED STATES PATENTS

| | | | |
|---|---|---|---|
| 1,422,841 | 7/1922 | Dey | 43—17.6 X |
| 2,217,565 | 10/1940 | Seigle et al. | 43—17.6 |
| 2,329,790 | 9/1943 | Seigle | 43—17.6 |
| 2,550,988 | 5/1951 | Flournoy | 43—17.6 |
| 2,598,471 | 5/1952 | Waite | 43—17.6 |
| 2,988,840 | 6/1961 | Seigle | 43—17.5 X |
| 3,156,841 | 11/1964 | Ayres. | |
| 3,292,294 | 12/1966 | Beach et al. | 43—17.5 |

SAMUEL KOREN, Primary Examiner

J. H. CZERWONKY, Assistant Examiner

U.S. Cl. X.R.

313—315